United States Patent [19]

Etzel et al.

[11] Patent Number: 5,198,088
[45] Date of Patent: Mar. 30, 1993

[54] APPARATUS FOR THE PREPARATION OF ALKALI METAL MONOFLUORHOSPHATES

[75] Inventors: Armin Etzel, Hemsbach; Richard Taenzler, Laudenbach; Alexander Maurer, Mannheim; Gerhard Schoenmann, Ludwigshafen; Hans-Georg Steinert, Eschelbronn, all of Fed. Rep. of Germany

[73] Assignee: BK Ladenburg GmbH Gesellschaft fuer Chemische Erzeugnisse, Ladenburg, Fed. Rep. of Germany

[21] Appl. No.: 640,797

[22] Filed: Jan. 16, 1991

[30] Foreign Application Priority Data

Jan. 19, 1990 [DE] Fed. Rep. of Germany ....... 4001430

[51] Int. Cl.$^5$ .............................................. C23F 13/00
[52] U.S. Cl. ..................................... 204/196; 204/147; 422/202; 423/301; 423/305
[58] Field of Search ............... 204/147, 148, 196, 197; 422/202; 423/301, 305

[56] References Cited

U.S. PATENT DOCUMENTS 641,438  1/1900  Darling .............................. 204/196
3,345,278 10/1967 Mekjean ............................ 204/196

FOREIGN PATENT DOCUMENTS 0362746  4/1990  European Pat. Off. .
1792648  1/1972  Fed. Rep. of Germany .
1284089  8/1972  United Kingdom .

*Primary Examiner*—T. Tung
*Attorney, Agent, or Firm*—Foley & Lardner

[57] ABSTRACT

An apparatus for the preparation of alkali metal monofluorophosphates is disclosed. The apparatus includes a melting crucible of a platinum/rhodium alloy, devices for feeding the alkali metal fluoride and alkali metal metaphosphate or alkali metal polyphosphate raw materials into the upper part of the crucible, an outflow orifice for molten alkali metal fluorophosphate in the bottom of the crucible, a corresponding discharge orifice in the furnace, and a cooling arrangement, wherein a direct voltage is applied between the cooling arrangement and the melting crucible which is connected as the anode.

5 Claims, 1 Drawing Sheet

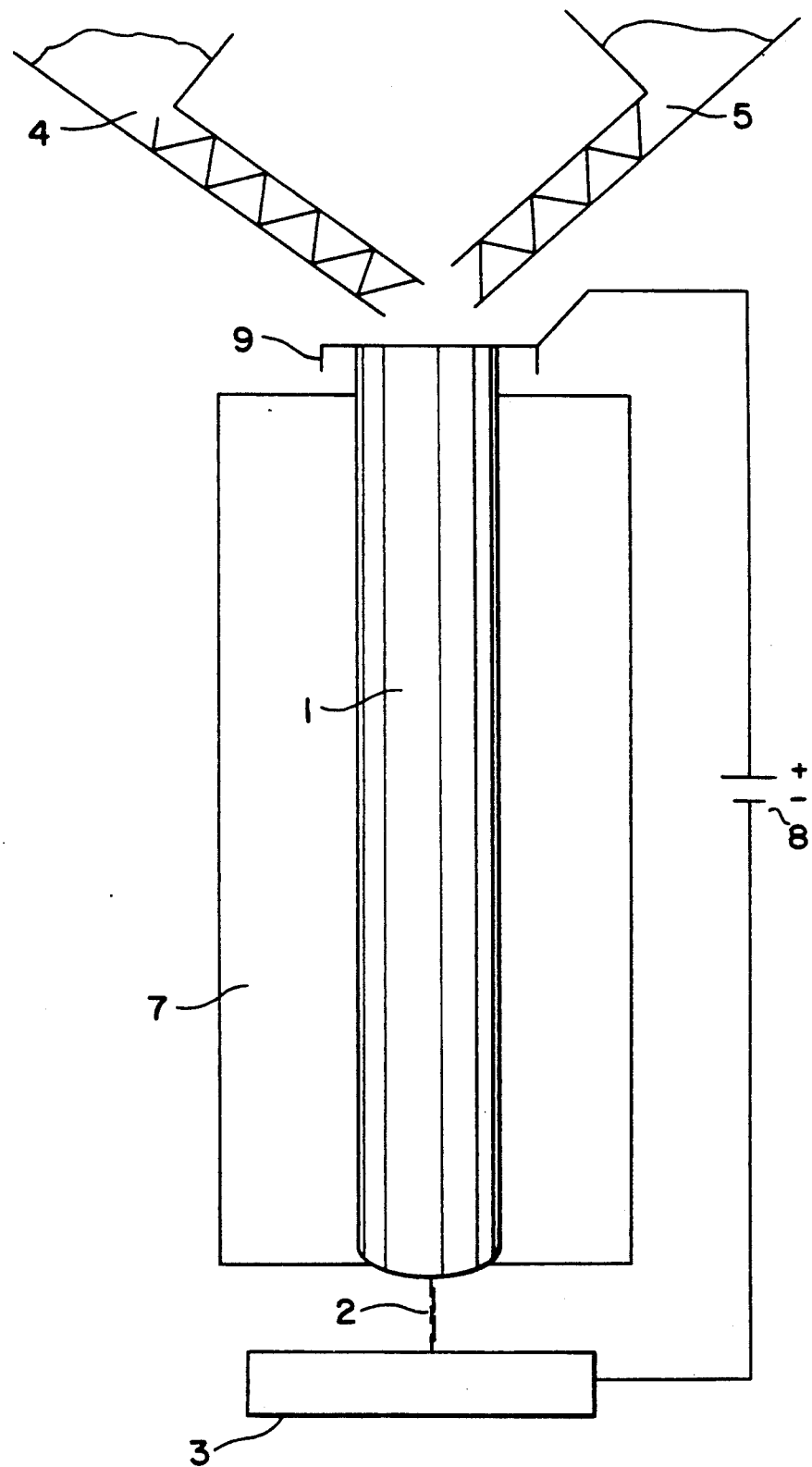

APPARATUS FOR THE PREPARATION OF ALKALI METAL MONOFLUORHOSPHATES

BACKGROUND OF THE INVENTION

The present invention relates to an improved apparatus and process for the preparation of sodium monofluoro-phosphates, utilizing a melting crucible of a platinum/rhodium alloy.

Alkali metal monofluorophosphates are prepared by melting a mixture of an anhydrous alkali metal fluoride and an alkali metal meta-, pyro- or polyphosphate at temperatures of about 800°-1000° C. in melting vessels of platinum, silver, iron or graphite (German Patent 1,792,648). Because of the high heat stability, hardness and chemical resistance, crucibles of a platinum/rhodium alloy are preferably used for this purpose.

In spite of the high resistance of the crucible materials used, however, holes and cracks are found in the crucible wall after a certain operating period, and these make it necessary to replace the crucibles. The use of less expensive crucible material, for example iron or graphite, has not proved appropriate, since these show increased wear, whereby the end product is contaminated.

SUMMARY OF THE INVENTION

It is therefore an object of the present invention to provide an apparatus and process in which the rare metal crucibles used show an extended service life and hence improved economy.

This and other objects according to the invention are provided by an apparatus for the preparation of alkali metal monofluorophosphates, comprising a melting crucible of a platinum/rhodium alloy; a heating jacket surrounding the crucible; means for feeding alkali metal fluoride and alkali metal metaphosphate or alkali metal polyphosphate raw materials into the upper part of the crucible; an outflow orifice for molten alkali metal fluorophosphate in the bottom of the crucible; and cooling means, wherein a direct voltage is applied between the cooling means and the melting crucible in which the cooling means is connected as the cathode and the crucible is connected as the anode.

There has also been provided according to the present invention an improved process for the preparation of alkali metal monofluorophosphates characterized by the use of the improved apparatus of the invention.

Other objects, features and advantages according to the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWING

The single FIGURE of drawing shows an apparatus according to the present invention.

DETAILED DESCRIPTION OF THE PREFERRED EMBODIMENTS

The single FIGURE of drawing shows a melting apparatus according to the present invention, comprising crucible 1 of a platinum/rhodium alloy, from which finished product runs through outflow 2 in the bottom of the crucible into cooling arrangement 3. Crucible 1 is continuously recharged with raw material from phosphate feeding device 4 and fluoride feeding device 5. Crucible 1 is surrounded by heating jacket 7. A direct voltage from electric power supply 8 is applied between cooling arrangement 3 and crucible 1, with crucible 1 being connected as the anode and cooling arrangement 3 being connected as the cathode. Electric power supply 8 may be connected to rim 9 of crucible 1. The voltage is about 1-5 volt, preferably 2-4 volt.

Whereas such crucibles normally show corrosion cracks after an operating period of 10-20 days, an apparatus according to the invention can be operated for 85 days without corrosion damage occurring.

It has been discovered that corrosion damage arises from elemental phosphorus which forms, with the platinum/rhodium alloy, a new compound having an approximate composition of 24 parts of platinum, 63 parts of rhodium and 13 parts of phosphorus, and a melting point of about 600°-800° C. The compound precipitates from the phosphate melt, so that crucible regions of this composition liquefy under the reaction conditions and are melted out of the crucible wall with formation of holes.

It is known from the manufacture of phosphate glasses that, within the glass melting furnace, electric currents can occur which lead to a reduction of the phosphates and hence can effect corrosion of the platinum lining of the melting furnace. It is therefore usual to ground all conductive parts on the apparatus, in order to ensure uniform electric potential in all parts of the apparatus.

In the preparation of alkali metal monofluorophosphates, this method does not give the desired result, as shown by the apparatus of the state of the art in which the crucible and cooling arrangement are grounded, since these crucibles still corrode. Surprisingly, however, an apparatus, in which the crucibles show virtually no corrosion, can be created by the simple measure of no longer grounding the apparatus parts, thus bringing them to an equal potential, but rather by providing the cooling arrangement with a negative charge opposite the crucible wall by applying a small direct voltage.

The apparatus according to the invention has been compared below with a corresponding conventional apparatus.

EXPERIMENTAL DESCRIPTION

Furnace Structure

The melting furnace consists of a cylindrical platinum/rhodium crucible having a height of 0.8 m and a diameter of 8 cm and an outflow orifice in the flat bottom. The crucible is inserted into an electrically-heated furnace. At the bottom, the furnace has a discharge orifice which is aligned with the outflow orifice of the crucible and below which a cooling arrangement is located.

The crucible and cooling arrangement are grounded and/or connected to a current source via a lug.

MELTING PROCEDURE

The furnace is heated to a temperature of 800° C.-1200° C. and, at this temperature, the crucible is continuously charged with a granular mixture of 67.2 kg of sodium fluoride and 160 kg of sodium metaphosphate, via a vibrating chute, and about 227 kg of sodium monofluorophosphate melt are correspondingly removed from the bottom.

The service lives, i.e., the time until holes or cracks appear in the crucible wall, are listed in the table which follows.

TABLE

| Crucible No. | Service life (days) | |
|---|---|---|
| 1 | 8 | |
| 2 | 17 | |
| 3 | 13 | Comparison, |
| 4 | 29 | grounded |
| 5 | 6 | |
| 6 | 22 | |
| 7 | 85 | |
| 8 | >38 | According to the invention, with 2-4 V voltage |

Crucibles No. 1-6 which, as a comparison according to the state of the art, were grounded in the same way as the cooling arrangement, show clearly visible holes and cracks due to corrosion in the upper region at the end of the particular test time, i.e., the wall material is broken out at these points and the edges consist of a Pt/Rh/P mixture of the approximate composition 24:63:13. Crucibles which were connected as the anode according to the invention opposite the cooling trough with a voltage difference of 2–4 volt, showed no melt corrosion. The inner walls of the crucible and the edges of any crack areas which result from material fatigue do not show any significant content of phosphorus alloy.

The comparison of the two kinds of apparatus shows the clear advantages of the invention.

What is claimed is:

1. An apparatus for the preparation of alkali metal monofluorophosphate, comprising:
    a melting crucible of a platinum/rhodium alloy, said crucible having an upper part and a bottom;
    a heating jacket surrounding the crucible;
    means for feeding alkali metal fluoride and alkali metal metaphosphate or alkali metal polyphosphate raw materials into the upper part of the crucible;
    an outflow orifice for molten alkali metal fluorophosphate in the bottom of the crucible;
    cooling means for cooling alkali metal fluorophosphate discharged from the crucible; and
    a means for applying a direct voltage between the cooling means and the melting crucible, in which the cooling means is connected as a cathode and the crucible is connected as an anode.

2. The apparatus as claimed in claim 1, wherein the means for applying a direct voltage is adaptable to apply about 1 to 5 volts.

3. The apparatus as claimed in claim 2, wherein the means for applying a direct voltage is adaptable to apply about 2 to 4 volts.

4. The apparatus as claimed in claim 1, wherein the crucible is cylindrical.

5. The apparatus as claimed in claim 1, wherein the heating jacket is adaptable to provide a temperature between about 800° and 1200° C. in the crucible.

* * * * *